US007494745B2

(12) United States Patent
Kim et al.

(10) Patent No.: US 7,494,745 B2
(45) Date of Patent: Feb. 24, 2009

(54) ORGANIC ELECTROLYTIC SOLUTION AND LITHIUM BATTERY EMPLOYING THE SAME

(75) Inventors: Han-Su Kim, Seoul (KR); Myung-Dong Cho, Hwaseong-si (KR); Dong-Min Im, Seoul (KR); Boris A. Trofimov, Irkutsk (RU); Albina Mikhalev, Irkutsk (RU)

(73) Assignee: Samsung SDI Co., Ltd., Suwon (KR)

( * ) Notice: Subject to any disclaimer, the term of this patent is extended or adjusted under 35 U.S.C. 154(b) by 562 days.

(21) Appl. No.: 11/284,974

(22) Filed: Nov. 23, 2005

(65) Prior Publication Data

US 2006/0147807 A1  Jul. 6, 2006

(30) Foreign Application Priority Data

Dec. 30, 2004  (KR) .................. 10-2004-0117015

(51) Int. Cl.
H01M 10/40 (2006.01)
H01M 4/02 (2006.01)

(52) U.S. Cl. ................. 429/324; 429/326; 429/332; 429/339; 429/341; 252/62.2; 252/182.1; 252/500

(58) Field of Classification Search ............. 252/62.2, 252/182.1; 429/324–343; 560/204
See application file for complete search history.

(56) References Cited

U.S. PATENT DOCUMENTS 5,352,548 A * 10/1994 Fujimoto et al. ............ 429/341

2005/0014072 A1 * 1/2005 Yamaguchi et al. ......... 429/329

FOREIGN PATENT DOCUMENTS

| JP | 2002-367673 | * 12/2002 |
| JP | 2002-367674 | * 12/2002 |
| JP | 2004-006188 | * 1/2004 |
| JP | 2005-108440 | * 4/2005 |

OTHER PUBLICATIONS

Yang et al, "Composition analysis of the passive film on the carbon electrode of Li-ion battery with an EC-based electrolyte," J. Power Soruces 1998, 72, 66-70.*

* cited by examiner

Primary Examiner—Stuart Hendrickson
Assistant Examiner—Kallambella Vijayakumar
(74) Attorney, Agent, or Firm—H.C. Park & Associates, PLC

(57) ABSTRACT

An organic electrolytic solution and a lithium battery employing the same are provided. The organic electrolytic solution includes: a lithium salt; an organic solvent containing a high dielectric constant solvent and a low boiling point solvent; and a carbonate or oxalate derivative having at least one substituted or unsubstituted cyano group. The organic electrolytic solution and the lithium battery employing the same have improved reductive decomposition stability, thereby decreasing an irreversible capacity after a first cycle and improving the charge/discharge efficiency and lifespan of the battery. The lithium battery has non-varying chemical properties at room temperature and a uniform thickness after standard charging, and thus has high reliability.

20 Claims, 1 Drawing Sheet

ORGANIC ELECTROLYTIC SOLUTION AND LITHIUM BATTERY EMPLOYING THE SAME

The present invention relates to a proton conductor that may exhibit excellent proton conductivity at temperatures above 100° C. without humidification.

CROSS-REFERENCE TO RELATED PATENT APPLICATION

This application claims the benefit of Korean Patent Application No. 10-2004-0117015, filed on Dec. 30, 2004, in the Korean Intellectual Property Office, the disclosure of which is incorporated herein in its entirety by reference.

BACKGROUND OF THE INVENTION

1. Field of the Invention

The present invention relates to a lithium battery, and more particularly, to an organic electrolytic solution having high reliability since a battery thickness is maintained within an allowed range, and a lithium battery employing the same.

2. Description of the Related Art

As portable electronic devices, such as video cameras, cellular phones, notebook computers, etc., become more lightweight and have increasingly high performance, more research into batteries used as power supplies for such portable devices must be conducted. In particular, chargeable lithium secondary batteries have 3 times the energy density per unit weight than conventional lead storage batteries, nickel-cadmium batteries, nickel-hydrogen batteries, nickel-zinc batteries, etc., and can be rapidly charged, and thus are a favorite topic of research at present.

In a lithium ion battery, transition metal compounds such as $LiNiO_2$, $LiCoO_2$, $LiMn_2O_4$, $LiFePO_4$, $LiNi_xCo_{1-x}O_2$ (x=1, 2), $Ni_{1-x-y}Co_xMn_yO_2$ ($0 \leq x \leq 0.5$, $0 \leq y \leq 0.5$) or oxides thereof with lithium are used as a cathode active material and lithium metal, an alloy of lithium, a carbonaceous material, a graphite material, etc. are used as an anode active material.

Electrolytes are divided into liquid electrolytes and solid electrolytes. When a liquid electrolyte is used, many safety problems, such as risk of fire due to leakage of the electrolytic solution and breakage of the battery due to vaporization of the electrolytic solution arise. To solve these problems, a solid electrolyte has been proposed for use instead of the liquid electrolyte. The solid electrolyte does not leak and is easily processed, and thus many studies have been conducted thereon, such as, a polymer solid electrolyte, which is actively being studied. Currently known polymer solid electrolytes are divided into complete solid electrolytes containing no organic electrolytic solution and gel-type electrolytes containing an organic electrolytic solution.

Since a lithium battery is generally driven at a high operating voltage, a conventional aqueous electrolytic solution cannot be used. This is because lithium contained in an anode and an aqueous solution vigorously reacts with each other. Thus, an organic electrolytic solution in which a lithium salt is dissolved in an organic solvent is used in the lithium battery. In this case, organic solvents having high ionic conductivity and dielectric constant and low viscosity may be used. Since it is difficult to obtain a single organic solvent satisfying all these requirements, a mixed solvent including an organic solvent with a high dielectric constant and an organic solvent with a low dielectric constant, a mixed solvent including an organic solvent with a high dielectric constant and an organic solvent with a low viscosity, etc. are used.

A lithium secondary battery forms a passivation layer such as a solid electrolyte interface (SEI) film on a negative electrode surface upon initial charging through a reaction of carbon in the anode with the electrolytic solution. The SEI film enables the battery to be stably charged and discharged without further decomposition of the electrolytic solution (*J. Power Sources,* 51 (1994), 79-104). Also, the SEI film acts as an ion tunnel through which only lithium ions pass and solvates lithium ions to prevent cointercalation of an organic solvent, which moves with the lithium ions, into a carbon anode, thereby preventing a breakdown of the anode structure.

However, upon initial charging, gas is generated inside the battery due to decomposition of a carbonate-based organic solvent when forming the SEI film, which results in an increase in battery thickness (*J. Power Sources,* 72 (1998), 66-70). When the lithium battery is stored at high temperatures after being charged, the passivation layer gradually breaks down due to electrochemical energy and thermal energy increasing with time, the anode surface is exposed, and the amount of gas generated increases. Due to the generation of gas, an internal pressure of the battery increases, which causes a deformation of a central portion on a side of the battery, such as swelling of a rectangular lithium polymer battery in a certain direction? The increase in the internal pressure of the battery results in a local difference in adherence between electrode plates, thereby reducing performance and safety of the battery and making mounting of a set of lithium secondary battery difficult.

To solve the above problems, U.S. Pat. No. 5,353,548 discloses a method of preventing decomposition of a solvent and swelling of a battery by injecting a vinylene carbonate-based additive into an electrolytic solution to form a coating on a negative electrode surface through a reductive decomposition reaction of the additive. Similarly, JP Patent Publication Nos. 2002-367673 and 2002-367674 disclose an electrolytic solution including dicarboxylic diester and an aromatic compound having a molecular weight of 500 or less and JP Patent Publication No. 2004-006188 discloses an organic electrolytic solution including dicarboxylic acid, for example, oxalic acid or malonic acid, for a lithium secondary battery using a negative electrode active material which can be alloyed with lithium.

However, according to a method of forming a proper coating on a negative electrode surface by adding a small amount of an organic or inorganic material, the properties of the SEI membrane formed on the negative electrode surface vary according to the type of solvent used as the electrolytic solution and the electrochemical properties of the additive. In the case of the above-described conventional additives, since the resulting SEI film is still unstable, ion mobility in electrons is poor and the generation of gas due to the decomposition of the electrolytic solution is not sufficiently prevented.

SUMMARY OF THE INVENTION

The present invention provides an organic electrolytic solution ensuring reliability of a battery and ensuring that a battery thickness is within an allowed range when a charging/discharging cycle is repeated.

The present invention also provides a lithium battery employing the electrolytic solution.

According to an aspect of the present invention, there is provided an organic electrolytic solution including: a lithium salt; an organic solvent containing a high dielectric constant solvent and a low boiling point solvent; and a compound represented by formula (1):

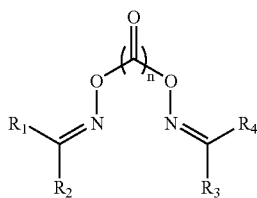

(1)

where each of $R_1$, $R_2$, $R_3$ and $R_4$ is independently a hydrogen atom, a halogen atom, a hydroxy group, a substituted or unsubstituted $C_{1-20}$ alkyl group, a substituted or unsubstituted $C_{1-20}$ alkoxy group, a substituted or unsubstituted $C_{2-20}$ alkenyl group, a substituted or unsubstituted $C_{6-30}$ aryl group, a substituted or unsubstituted $C_{6-30}$ aryloxy group, a substituted or unsubstituted $C_{2-30}$ heteroaryl group, or a substituted or unsubstituted $C_{2-30}$ heteroaryloxy group; and n is an integer between 1 and 4.

The compound represented by formula (1) may be a compound represented by formula (2):

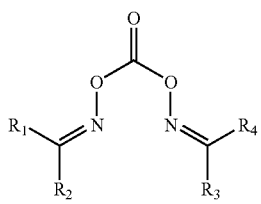

(2)

where $R_1$ to $R_4$ are the same as defined above.

The compound represented by formula (2) may be a compound represented by formula (3):

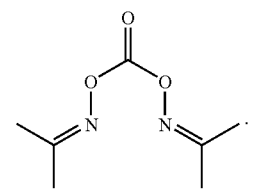

(3)

The compound represented by formula (1) may be a compound represented by formula (4):

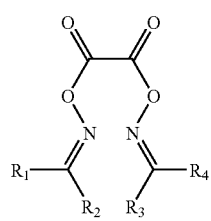

(4)

where $R_1$ to $R_4$ are the same as defined above.

The compound represented by formula (4) may be a compound represented by formula (5):

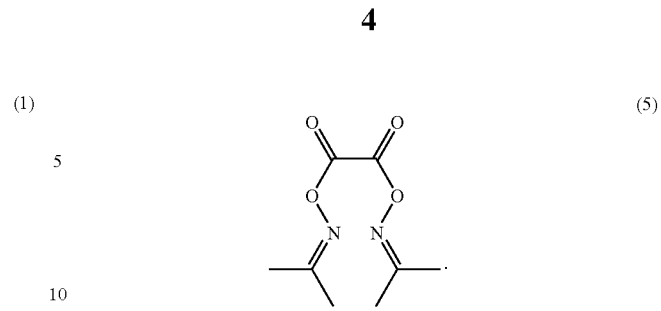

(5)

The amount of the compound represented by formula (1) may be 0.1 to 5% by weight based on the weight of the organic solvent.

The amount of the compound represented by formula (1) may be 1 to 3% by weight based on the weight of the organic solvent.

The concentration of the lithium salt may be 0.5 to 2.0 M.

The high dielectric constant solvent may include at least one solvent selected from the group consisting of ethylene carbonate, propylene carbonate, butylene carbonate and γ-butyrolactone.

The low boiling point solvent may include at least one solvent selected from the group consisting of dimethyl carbonate, ethylmethyl carbonate, diethyl carbonate, dipropyl carbonate, dimethoxyethane, diethoxyethane and a fatty acid ester derivative.

According to another aspect of the present invention, there is provided a lithium battery including: a cathode; an anode; and the organic electrolytic solution described above.

BRIEF DESCRIPTION OF THE DRAWINGS

The above and other features and advantages of the present invention will become more apparent by describing in detail exemplary embodiments thereof with reference to the attached drawing in which.

DETAILED DESCRIPTION OF THE INVENTION

Figure 1:
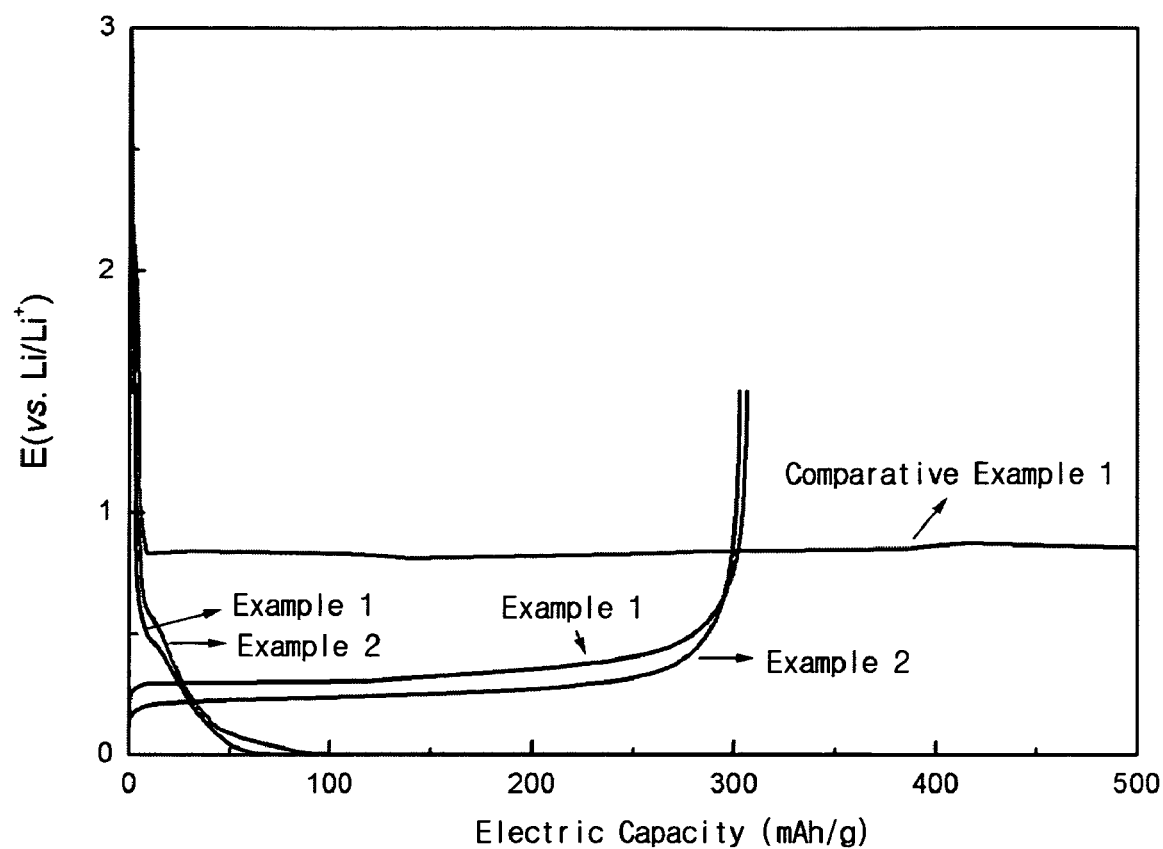
FIG. 1 is a graph illustrating the charge and discharge characteristic of lithium batteries employing organic electrolytic solutions according to embodiments of the present invention and the conventional art.

Hereinafter, the present invention will be described in more detail.

An organic electrolytic solution according to an embodiment of the present invention includes: a lithium salt; an organic solvent containing a high dielectric constant solvent and a low boiling point solvent; and a compound represented by formula (1):

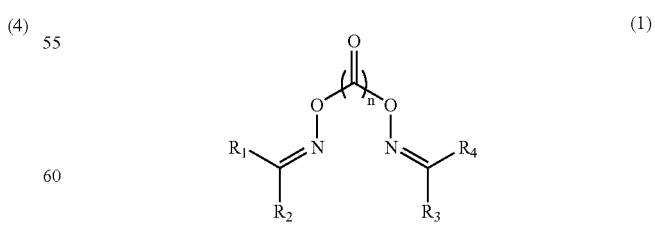

(1)

where each of $R_1$, $R_2$, $R_3$ and $R_4$ is independently a hydrogen atom, a halogen atom, a hydroxy group, a substituted or unsubstituted $C_{1-20}$ alkyl group, a substituted or unsubstituted $C_{1-20}$ alkoxy group, a substituted or unsubstituted $C_{2-20}$ alkenyl group, a substituted or unsubstituted $C_{6-30}$ aryl group, a substituted or unsubstituted $C_{6-30}$ aryloxy group, a substituted or unsubstituted $C_{2-30}$ heteroaryl group, or a substituted or unsubstituted $C_{2-30}$ heteroaryloxy group; and n is an integer between 1 and 4.

The compound represented by formula (1) reacts with solvent molecules through electrochemical reduction on an anode surface, thereby modifying a solid electrolyte interface (SEI) film on the anode surface. Since the modified compound has carbon-oxygen double bonds, the adhesion of the SEI film to the anode surface is strong and a side reaction between the anode surface and the electrolyte is prevented due to a high density of the SEI film, thereby suppressing decomposition of the electrolyte and swelling of the battery to prevent a reduction in the lifespan of the battery and improve reliability. In particular, a substituted or unsubstituted cyano group included in the compound enables electropolymerization by electrochemical reduction on the anode surface to occur when modifying the SEI film on the anode surface, thereby further suppressing the decomposition of the electrolyte and the swelling of the battery.

The compound represented by formula (1) is a carbonate derivative including a substituted or unsubstitued cyano group. When n is 1, the compound represented by formula (1) has a carbonate structure as a backbone and when n is 2, the compound represented by formula (1) has an oxalate structure as a backbone. When n is 3 or greater, a molecular skeleton becomes more flexible as the length of backbone increases, which improves adherence of the SEI film to the anode surface and the density of the SEI film.

The compound represented by formula (1) may be a compound represented by formula (2):

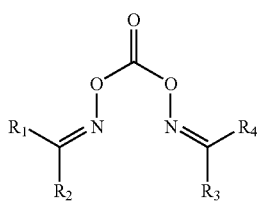

(2)

where $R_1$ to $R_4$ are the same as defined above.

The compound represented by formula (2) is the compound represented by formula (1) when n is 1 and its backbone has a carbonate structure. The compound represented by formula (2) may be a compound represented by formula (3):

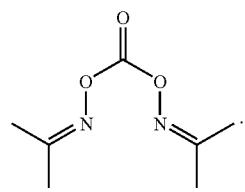

(3)

The compound represented by formula (3) is the compound represented by formula (2) where carbonate has a cyano group substituted by methyl group. In this case, only a methyl group in the compound has hydrogen atoms and the cyano group itself has no hydrogen atom.

When n is 2, the compound represented by formula (1) may be a compound represented by formula (4) having an oxalate structure as a backbone:

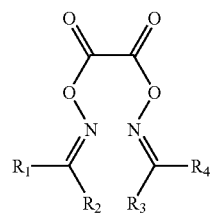

(4)

where $R_1$ to $R_4$ are the same as defined above.

The compound represented by formula (4) may be a compound represented by formula (5):

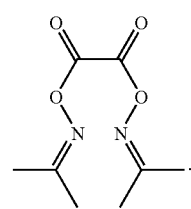

(5)

The amount of the compound represented by formula (1) is 0.1 to 5% by weight, and may be 1 to 3% by weight, based on the weight of the organic solvent. When the amount of the compound represented by formula (1) exceeds 5% by weight of the total organic solvent, the charge and discharge characteristics are poor since the amount of an effective material on which the performance of a battery depends is insufficient. When the amount of the compound represented by formula (1) is less than 0.1% by weight of the total organic solvent, the desired effects of the present invention cannot be obtained.

The high dielectric constant solvent is not particularly restricted as long as it is commonly used in the art and may be, for example, a cyclic carbonate, such as ethylene carbonate, propylene carbonate, or butylene carbonate, γ-butyrolactone, etc.

Also, the low boiling point solvent is a low boiling point solvent that is commonly used in the art and may be, for example, an aliphatic carbonate, such as dimethyl carbonate, ethylmethyl carbonate, diethyl carbonate, or dipropyl carbonate, dimethoxyethane, diethoxyethane, a fatty acid ester derivative, etc.

The volumetric ratio of the high dielectric constant solvent to the low boiling point solvent may be 1:1 to 1:9. When the ratio is outside of this range, the discharge capacity and charge/discharge cycle life of the battery may degrade.

The lithium salt is any lithium salt that is commonly used in a lithium battery and may include at least one compound selected from the group consisting of $LiClO_4$, $LiCF_3SO_3$, $LiPF_6$, $LiN(CF_3SO_2)$, $LiBF_4$, $LiC(CF_3SO_2)_3$ and $LiN(C_2F_5SO_2)_2$.

The concentration of the lithium salt in the organic electrolytic solution may be 0.5 to 2 M. When the concentration of the lithium salt is less than 0.5 M, the conductivity of the electrolytic solution is low, thereby degrading the performance of the electrolytic solution. When the concentration of the lithium salt is greater than 2.0 M, the viscosity of the electrolytic solution increases, and thus the mobility of lithium ions is reduced.

A lithium battery employing the organic electrolytic solution and a method of manufacturing the same will now be described.

A lithium battery according to an embodiment of the present invention includes: a cathode; an anode; and the organic electrolytic solution according to the previous embodiment.

The lithium battery is not particularly restricted and may be a lithium primary battery or a lithium secondary battery, such as a lithium ion battery, a lithium ion polymer battery, or a lithium sulfur battery.

The alkyl group used as a substituent in the compound in the present embodiment is a straight or branched radical having 1 to 20 carbon atoms, preferably 1 to 12 carbon atoms. More preferably, the alkyl radical is a lower alkyl having 1 to 6 carbon atoms. Examples of such an alkyl group include methyl, ethyl, n-propyl, isopropyl, n-butyl, isobutyl, sec-butyl, t-butyl, pentyl, iso-amyl, hexyl, etc. A lower alkyl radical having 1 to 3 carbon atoms can also be used.

The alkoxy group used as a substituent in the compound of formula (1) is an oxygen-containing straight or branched radical having a $C_1$-20 alkyl group. The alkoxy group may be a lower alkoxy radical having 1 to 6 carbon atoms is more preferable. Examples of such an alkoxy radical include methoxy, ethoxy, propoxy, butoxy and t-butoxy. A lower alkoxy radical having 1 to 3 carbon atoms is more preferable. The alkoxy radical may be further substituted by at least one halogen atom such as fluoro, chloro or bromo to provide a haloalkoxy radical. The lower haloalkoxy may have 1 to 3 carbon atoms, and examples thereof include fluoromethoxy, chloromethoxy, trifluoromethoxy, trifluoroethoxy, fluoroethoxy and fluoropropoxy.

The alkenyl group used as a substituent in the compound of formula (1) is a straight or branched $C_{2-30}$ aliphatic hydrocarbon group including a carbon-carbon double bond. The alkenyl group may have 2 to 12 carbon atoms, and preferably has 2 to 6 carbon atoms. The branched alkenyl group includes at least one lower alkyl or alkenyl group attached to a straight alkenyl group. Such an alkenyl group may be unsubstituted or substituted by at least one group selected from the group including, but not limited to, halo, carboxy, hydroxy, formyl, sulfo, sulfino, carbamoyl, amino and imino. Examples of the alkenyl group include ethenyl, propenyl, carboxyethenyl, carboxypropenyl, sulfinoethenyl and sulfonoethenyl.

The aryl group used as a substituent in the compound of formula (1) is used alone or in a combination and is a $C_{6-20}$ carbocyclic aromatic system including one or more rings. The rings may be attached or fused together using a pendent method. The term "aryl" includes aromatic radicals such as phenyl, naphthyl, tetrahydronaphthyl, indane and biphenyl. Preferably, the aryl is phenyl. The aryl group may be substituted by 1 to 3 groups selected from hydroxy, halo, haloalkyl, nitro, cyano, alkoxy, and lower alkylamino.

The aryloxy group used as a substituent in the compound of formula (1) is aryl-O—. The "aryl" in the aryloxy group is as defined above.

The heteroaryl group used as a substituent in the compound of formula (1) is a $C_{6-20}$ monovalent monocyclic or bicyclic aromatic radical that has 1, 2 or 3 hetero atoms selected from N, O and S. For example, the heteroaryl group may be a monovalent monocyclic or bicyclic aromatic radical in which at least one of the hetero atoms is oxidized or quaternarized to form, for example, an N-oxide or a quaternary salt. Examples of the heteroaryl group include thienyl, benzothienyl, pyridyl, pyrazinyl, pyrimidinyl, pyridazinyl, quinolinyl, quinoxalinyl, imidazolyl, furanyl, benzofuranyl, thiazolyl, isoxazolyl, benzisoxazolyl, benzimidazolyl, triazolyl, pyrazolyl, pyrolyl, indolyl, 2-pyridonyl, 4-pyridonyl, N-alkyl-2-pyridonyl, pyrazinonyl, pyridazynonyl, pyrimidinonyl, oxazolonyl, corresponding N-oxides thereof (e.g., pyridyl N-oxide, quinolinyl N-oxide), and quaternary salts thereof, but are not limited thereto.

The heteroaryloxy group used as a substituent in the compound of formula (1) is heteroaryl-O— and the "heteroaryl" in the heteroaryloxy group is as defined above.

The lithium battery of the present embodiment can be manufactured as follows.

First, a cathode active material, a conducting agent, a binder and a solvent are mixed to prepare a cathode active material composition. The cathode active material composition is directly coated on an Al current collector and dried to prepare a cathode plate. Alternatively, the cathode active material composition is cast on a separate substrate and a film obtained therefrom is laminated on an Al current collector to prepare a cathode plate.

The cathode active material is any lithium containing metal oxide that is commonly used in the art and examples thereof include $LiCoO_2$, $LiMn_xO_{2x}$, $LiNi_{1-x}Mn_xO_{2x}$ (x=1, 2), $Ni_{1-x-y}Co_xMn_yO_2$ ($0 \leq x \leq 0.5$, $0 \leq y \leq 0.5$), etc.

Carbon black is used as the conducting agent. The binder may be vinylidene fluoride/hexafluoropropylene copolymer, polyvinylidene fluoride, polyacrylonitrile, polymethylmethacrylate, polytetrafluoroethylene, a mixture thereof, or styrene butadiene rubber-based polymer. The solvent may be N-methylpyrrolidone, acetone, water, etc. The amounts of the cathode active material, the conducting agent, the binder and the solvent are those commonly used in a lithium battery.

Similarly, an anode active material, a conducting agent, a binder and a solvent are mixed to prepare an anode active material composition. The anode active material composition is directly coated on a Cu current collector, or is cast on a separate substrate and an anode active material film obtained therefrom is laminated on a Cu current collector to obtain an anode plate. The amounts of the anode active material, the conducting agent, the binder and the solvent are those commonly used in a lithium battery.

Lithium metal, a lithium alloy, a carbonaceous material or graphite is used as the anode active material. The conducting agent, the binder and the solvent in the anode active material composition are the same as those in the cathode active material composition. If desired, a plasticizer may be added to the cathode active material composition and the anode active material composition to produce pores inside the electrode plates.

The separator may be composed of any material that is commonly used in a lithium battery. A material having a low resistance to movement of ions of the electrolyte and a good ability to absorb the electrolytic solution is preferred. For example, the material may be a non-woven or woven fabric selected from the group consisting of glass fiber, polyester, Teflon, polyethylene, polypropylene, polytetrafluoroethylene (PTFE) and a combination thereof. More specifically, a lithium ion battery uses a windable separator composed of polyethylene, polypropylene, etc., and a lithium ion polymer battery uses a separator having an ability to impregnate an organic electrolytic solution. The separator may be prepared using the following method.

A polymer resin, filler and a solvent are mixed to prepare a separator composition. The separator composition is directly coated on an electrode and dried to form a separator film. Alternatively, the separator composition is cast on a substrate and dried, and then a separator film formed on the substrate is peeled off and laminated on an electrode.

The polymer resin is not particularly restricted and is any material that is used in a conventional binder for an electrode plate. Examples of the polymer resin include vinylidenefluoride/hexafluoropropylene copolymer, polyvinylidenefluoride, polyacrylonitrile, polymethylmethacrylate and a mixture thereof. In particular, vinylidenefluoride/hexafluoropropylene copolymer containing 8 to 25% by weight of hexafluoropropylene can be used.

The separator is interposed between the cathode plate and the anode plate to form a battery assembly. The battery assembly is wound or folded and placed in a cylindrical or rectangular battery case. Then, the organic electrolytic solution according to an embodiment of the present invention is injected into the battery case to complete the lithium ion battery.

Alternatively, a battery assembly is prepared in the form of a bicell and the organic electrolytic solution according to an embodiment of the present invention is impregnated therein. Then, the resultant is placed in a pouch and sealed to complete a lithium ion polymer battery.

The present invention will now be described in greater detail with reference to the following examples. The following examples are for illustrative purposes only and are not intended to limit the scope of the invention.

EXAMPLE 1

Preparation of Electrolytic Solution

3% by weight of di(dimethylcyano) carbonate represented by formula (3) was added as an additive to an organic solvent mixture containing 30% by volume of propylene carbonate and 70% by volume of dimethyl carbonate and 1M $LiPF_6$ was used as a lithium salt to prepare an organic electrolytic solution.

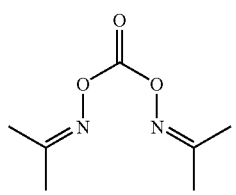

(3)

EXAMPLE 2

Preparation of Electrolytic Solution

3% by weight of di(dimethylcyano) oxalate represented by formula (5) was added as an additive to an organic solvent mixture containing 30% by volume of propylene carbonate and 70% by volume of dimethyl carbonate and 1M $LiPF_6$ was used as a lithium salt to prepare an organic electrolytic solution.

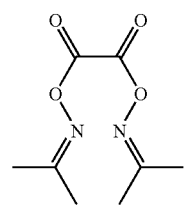

(5)

EXAMPLE 3

Preparation of Electrolytic Solution

An organic electrolytic solution was prepared in the same manner as in Example 1, except that 1% by weight of di(dimethylcyano) carbonate represented by formula (3) was added.

EXAMPLE 4

Preparation of Electrolytic Solution

An organic electrolytic solution was prepared in the same manner as in Example 2, except that 1% by weight of di(dimethylcyano) oxalate represented by formula (5) was added.

EXAMPLE 5

Preparation of Electrolytic Solution

An organic electrolytic solution was prepared in the same manner as in Example 1, except that 0.1% by weight of di(dimethylcyano) carbonate represented by formula (3) was added.

EXAMPLE 6

Preparation of Electrolytic Solution

An organic electrolytic solution was prepared in the same manner as in Example 2, except that 0.1% by weight of di(dimethylcyano) oxalate represented by formula (5) was added.

EXAMPLE 7

Preparation of Electrolytic Solution

An organic electrolytic solution was prepared in the same manner as in Example 1, except that 5% by weight of di(dimethylcyano) carbonate represented by formula (3) was added.

EXAMPLE 8

Preparation of Electrolytic Solution

An organic electrolytic solution was prepared in the same manner as in Example 2, except that 5% by weight of di(dimethylcyano) oxalate represented by formula (5) was added.

EXAMPLE 9

Preparation of Electrolytic Solution

An organic electrolytic solution was prepared in the same manner as in Example 1, except that 2% by weight of di(dimethylcyano) carbonate represented by formula (3) was added.

EXAMPLE 10

Preparation of Electrolytic Solution

An organic electrolytic solution was prepared in the same manner as in Example 2, except that 2% by weight of di(dimethylcyano) oxalate represented by formula (5) was added.

EXAMPLE 11

Preparation of Electrolytic Solution

An organic electrolytic solution was prepared in the same manner as in Example 1, except that 4% by weight of di(dimethylcyano) carbonate represented by formula (3) was added.

EXAMPLE 12

Preparation of Electrolytic Solution

An organic electrolytic solution was prepared in the same manner as in Example 2, except that 4% by weight of di(dimethylcyano) oxalate represented by formula (5) was added.

EXAMPLE 13

Preparation of Electrolytic Solution

An organic electrolytic solution was prepared in the same manner as in Example 1, except that 0.05% by weight of di(dimethylcyano) carbonate represented by formula (3) was added.

EXAMPLE 14

Preparation of Electrolytic Solution

An organic electrolytic solution was prepared in the same manner as in Example 2, except that 0.05% by weight of di(dimethylcyano) oxalate represented by formula (5) was added.

COMPARATIVE EXAMPLE 1

Preparation of Electrolytic Solution

An organic solvent mixture containing 30% by volume of propylene carbonate and 70% by volume of dimethyl carbonate and 1M $LiPF_6$ as a lithium salt were used to prepare an organic electrolytic solution without an additive.

COMPARATIVE EXAMPLE 2

Preparation of Electrolytic Solution

3% by weight of dimethyl oxalate as an additive was added to an organic solvent mixture containing 30% by volume of propylene carbonate and 70% by volume of dimethyl carbonate and 1M $LiPF_6$ as a lithium salt to prepare an organic electrolytic solution.

COMPARATIVE EXAMPLE 3

Preparation of Electrolytic Solution

An organic electrolytic solution was prepared in the same manner as in Comparative Example 2, except that 1% by weight of dimethyl oxalate was added.

COMPARATIVE EXAMPLE 4

Preparation of Electrolytic Solution

3% by weight of diethyl oxalate as an additive was added to an organic solvent mixture containing 30% by volume of propylene carbonate and 70% by volume of dimethyl carbonate and 1M $LiPF_6$ as a lithium salt to prepare an organic electrolytic solution.

EXAMPLES 15-28

Manufacturing of Lithium Battery

96% by weight of $LiCoO_2$, 2% by weight of polyvinylidenefluoride (PVdF) as a binder and 3% by weight of a carbon conducting agent were mixed, and then 100 ml of N-methylpyrrolidone (NMP) and ceramic balls were added thereto. Then, the mixture was placed in a 200 ml plastic bottle and blended for 10 hours. The mixture was cast on a 15 μm thick Al foil at intervals of 250 μm with a doctor blade to obtain a cathode electrode. The cathode electrode was placed in an oven at 110° C. and dried for about 12 hours to thoroughly evaporate the NMP. Then, the cathode electrode was roll-pressed to obtain a 95 μm thick cathode.

96% by weight of a graphite-based powder as an anode active material, 2% by weight of PVdF as a binder and 100 ml of NMP were mixed, and then ceramic balls were added thereto. Then, the mixture blended for about 10 hours. The mixture was cast on a 19 μm thick Cu foil at intervals of 300 μm with a doctor blade to obtain an anode electrode. The anode electrode was placed in an oven at 90° C. and dried for about 10 hours to thoroughly evaporate the NMP. Then, the anode electrode was roll-pressed to obtain a 120 μm thick cathode.

A 20 μm thick polyethylene/polypropylene microporous membrane (Hoecst Cellanese, U.S.A.) was used as a separator.

The separator was interposed between the electrodes prepared above. The resultant was wound and pressed, and then placed in a rectangular can. The electrolytic solutions prepared in Examples 1-14 were injected into the can, thereby obtaining a rectangular battery.

COMPARATIVE EXAMPLES 5-8

Manufacturing of Lithium Battery

Rectangular cells were manufactured in the same manner as in Examples 15-28, except that the organic electrolytic solutions prepared in Comparative Examples 1-4 were used.

EXPERIMENTAL EXAMPLE 1

Charge/Discharge of Battery

Lithium batteries (Example 15 and 16, and Comparative Example 5) obtained using organic electrolytic solutions prepared in Examples 1 and 2 and Comparative Example 1 were subjected to a charging/discharging cycle and the results are illustrated in FIG. 1. The lithium battery of Comparative Example 5 in which the organic electrolytic solution contained no additive irreversibly decomposed the electrolyte, and thus charging/discharging was impossible. Meanwhile, the lithium batteries of Examples 15 and 16 normally conducted charging/discharging.

EXPERIMENTAL EXAMPLE 2

Thickness of Battery after Charging

Lithium batteries manufactured in Examples 15-28 and Comparative Examples 5-8 were charged to 4.2 V, and then a thickness increase rate (%) of batteries after charging was measured using a micrometer. The obtained results are indicated in Table 1.

EXPERIMENTAL EXAMPLE 3

Cycling of Battery

Lithium batteries manufactured in Examples 15-28 and Comparative Examples 5-8 were subjected to a charging/discharging cycle at a 1C rate. Capacity retention after 100 cycles relative to an initial capacity was determined and the results are indicated in Table 1.

TABLE 1

|  | Thickness increase rate (%) after charging | Capacity retention (%) after 100 cycles |
|---|---|---|
| Example 15 | 13.3 | 90.1 |
| Example 16 | 10.1 | 92.4 |
| Example 17 | 20.1 | 88.3 |
| Example 18 | 18.3 | 89.8 |
| Example 19 | 23.1 | 83.9 |
| Example 20 | 22.0 | 85.6 |
| Example 21 | 12.8 | 92.1 |
| Example 22 | 10.2 | 93.7 |
| Example 23 | 17.3 | 89.7 |
| Example 24 | 16.7 | 90.9 |
| Example 25 | 13.1 | 91.2 |
| Example 26 | 10.1 | 92.6 |
| Example 27 | 38.7 | 49.1 |
| Example 28 | 36.4 | 53.9 |
| Comparative Example 5 | 56.9 | 21.9 |
| Comparative Example 6 | 60.1 | 19.6 |
| Comparative Example 7 | 55.4 | 25.0 |
| Comparative Example 8 | 50.6 | 30.8 |

As can be seen from Table 1, the Lithium batteries of Comparative Examples 5-8 have a maximum thickness increase rate of 60.1% and capacity retentions of about 20%, whereas the lithium batteries of Examples 15-28 have the thickness increase rate of about 12% and capacity retentions of 90% or greater. Thus, the lithium batteries of Examples 15-28 using the organic electrolytic solutions according to embodiments of the present invention have better cell performance.

The organic electrolytic solution and the lithium battery employing the same according to embodiments of the present invention have improved reductive decomposition stability, thereby decreasing an irreversible capacity after a first cycle and improving the charge/discharge efficiency and lifespan of the battery. The lithium battery has non-varying chemical properties at room temperature and a uniform thickness after standard charging, and thus has high reliability.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An organic electrolytic solution comprising:
   a lithium salt;
   an organic solvent containing a high dielectric constant solvent and a low boiling point solvent; and
   a compound represented by formula (1):

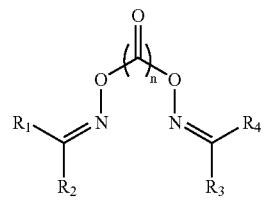

(1)

where each of $R_1$, $R_2$, $R_3$ and $R_4$ is independently a hydrogen atom, a halogen atom, a hydroxy group, a substituted or unsubstituted $C_{1-20}$ alkyl group, a substituted or unsubstituted $C_{1-20}$ alkoxy group, a substituted or unsubstituted $C_{2-20}$ alkenyl group, a substituted or unsubstituted $C_{6-30}$ aryl group, a substituted or unsubstituted $C_{6-30}$ aryloxy group, a substituted or unsubstituted $C_{2-30}$ heteroaryl group, or a substituted or unsubstituted $C_{2-30}$ heteroaryloxy group; and
n is an integer between 1 and 4.

2. The organic electrolytic solution of claim 1, wherein the compound represented by formula (1) is a compound represented by formula (2):

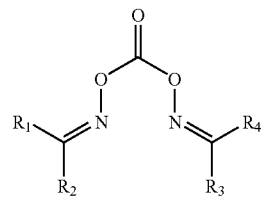

(2)

where $R_1$ to $R_4$ are the same as defined in claim 1.

3. The organic electrolytic solution of claim 2, wherein the compound represented by formula (2) is a compound represented by formula (3):

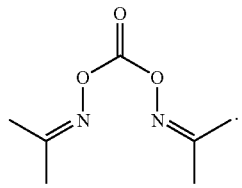

(3)

4. The organic electrolytic solution of claim 1, wherein the compound represented by formula (1) is a compound represented by formula (4):

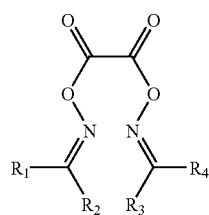

where $R_1$ to $R_4$ are the same as defined in claim 1.

5. The organic electrolytic solution of claim 4, wherein the compound represented by formula (4) is a compound represented by formula (5):

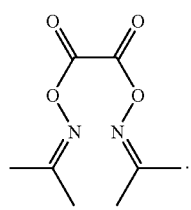

6. The organic electrolytic solution of claim 1, wherein the amount of the compound represented by formula (1) is 0.1 to 5% by weight based on the weight of the organic solvent.

7. The organic electrolytic solution of claim 1, wherein the amount of the compound represented by formula (1) is 1 to 3% by weight based on the weight of the organic solvent.

8. The organic electrolytic solution of claim 1, wherein the concentration of the lithium salt is 0.5 to 2.0 M.

9. The organic electrolytic solution of claim 1, wherein the high dielectric constant solvent comprises at least one solvent selected from the group consisting of ethylene carbonate, propylene carbonate, butylene carbonate and γ-butyrolactone.

10. The organic electrolytic solution of claim 1, wherein the low boiling point solvent includes at least one solvent selected from the group consisting of dimethyl carbonate, ethylmethyl carbonate, diethyl carbonate, dipropyl carbonate, dimethoxyethane, diethoxyethane and a fatty acid ester derivative.

11. A lithium battery comprising:
a cathode;
an anode; and
an organic electrolytic solution comprising:
a lithium salt;
an organic solvent containing a high dielectric constant solvent and a low boiling point solvent; and
a compound represented by formula (1):

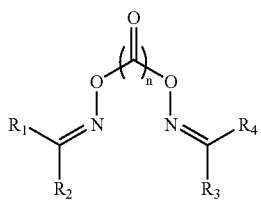

where each of $R_1$, $R_2$, $R_3$ and $R_4$ is independently a hydrogen atom, a halogen atom, a hydroxy group, a substituted or unsubstituted $C_{1-20}$ alkyl group, a substituted or unsubstituted $C_{1-20}$ alkoxy group, a substituted or unsubstituted $C_{2-20}$ alkenyl group, a substituted or unsubstituted $C_{6-30}$ aryl group, a substituted or unsubstituted $C_{6-30}$ aryloxy group, a substituted or unsubstituted $C_{2-30}$ heteroaryl group, or a substituted or unsubstituted $C_{2-30}$ heteroaryloxy group; and n is an integer between 1 and 4.

12. The lithium battery of claim 11, wherein the compound represented by formula (1) is a compound represented by formula (2):

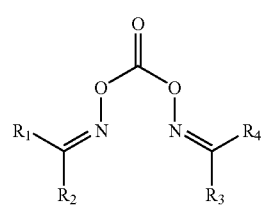

where $R_1$ to $R_4$ are the same as defined in claim 11.

13. The lithium battery of claim 12, wherein the compound represented by formula (2) is a compound represented by formula (3):

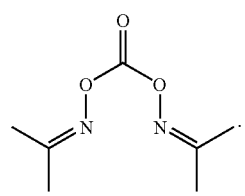

14. The lithium battery of claim 11, wherein the compound represented by formula (1) is a compound represented by formula (4):

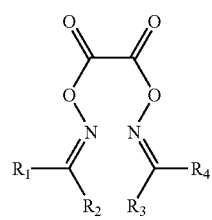

where $R_1$ to $R_4$ are the same as defined in claim 11.

15. The lithium battery of claim 14, wherein the compound represented by formula (4) is a compound represented by formula (5):

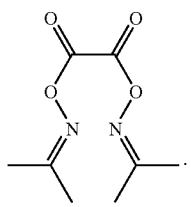

(5)

16. The lithium battery of claim 11, wherein the amount of the compound represented by formula (1) is 0.1 to 5% by weight based on the weight of the organic solvent.

17. The lithium battery of claim 11, wherein the amount of the compound represented by formula (1) is 1 to 3% by weight based on the weight of the organic solvent.

18. The lithium battery of claim 11, wherein the concentration of the lithium salt is 0.5 to 2.0 M.

19. The lithium battery of claim 11, wherein the high dielectric constant solvent comprises at least one solvent selected from the group consisting of ethylene carbonate, propylene carbonate, butylene carbonate and γ-butyrolactone.

20. The lithium battery of claim 11, wherein the low boiling point solvent includes at least one solvent selected from the group consisting of dimethyl carbonate, ethylmethyl carbonate, diethyl carbonate, dipropyl carbonate, dimethoxyethane, diethoxyethane and a fatty acid ester derivative.

* * * * *